Patented Mar. 20, 1923.

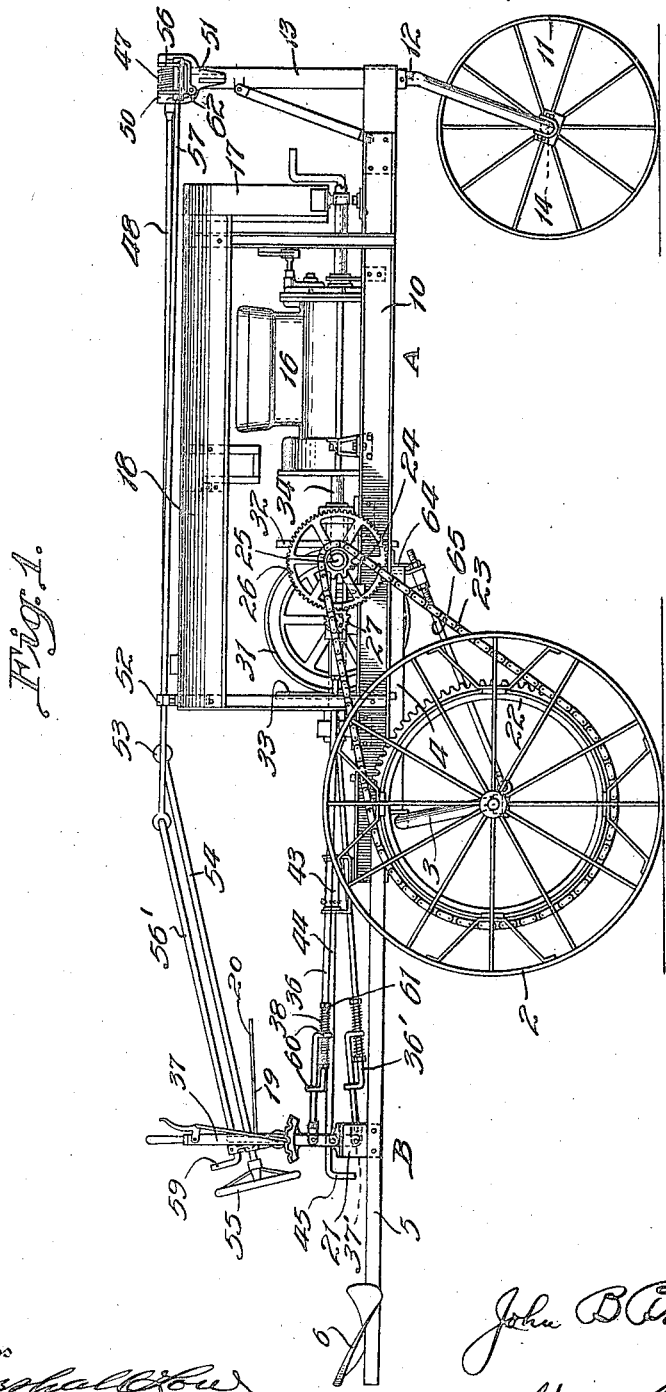

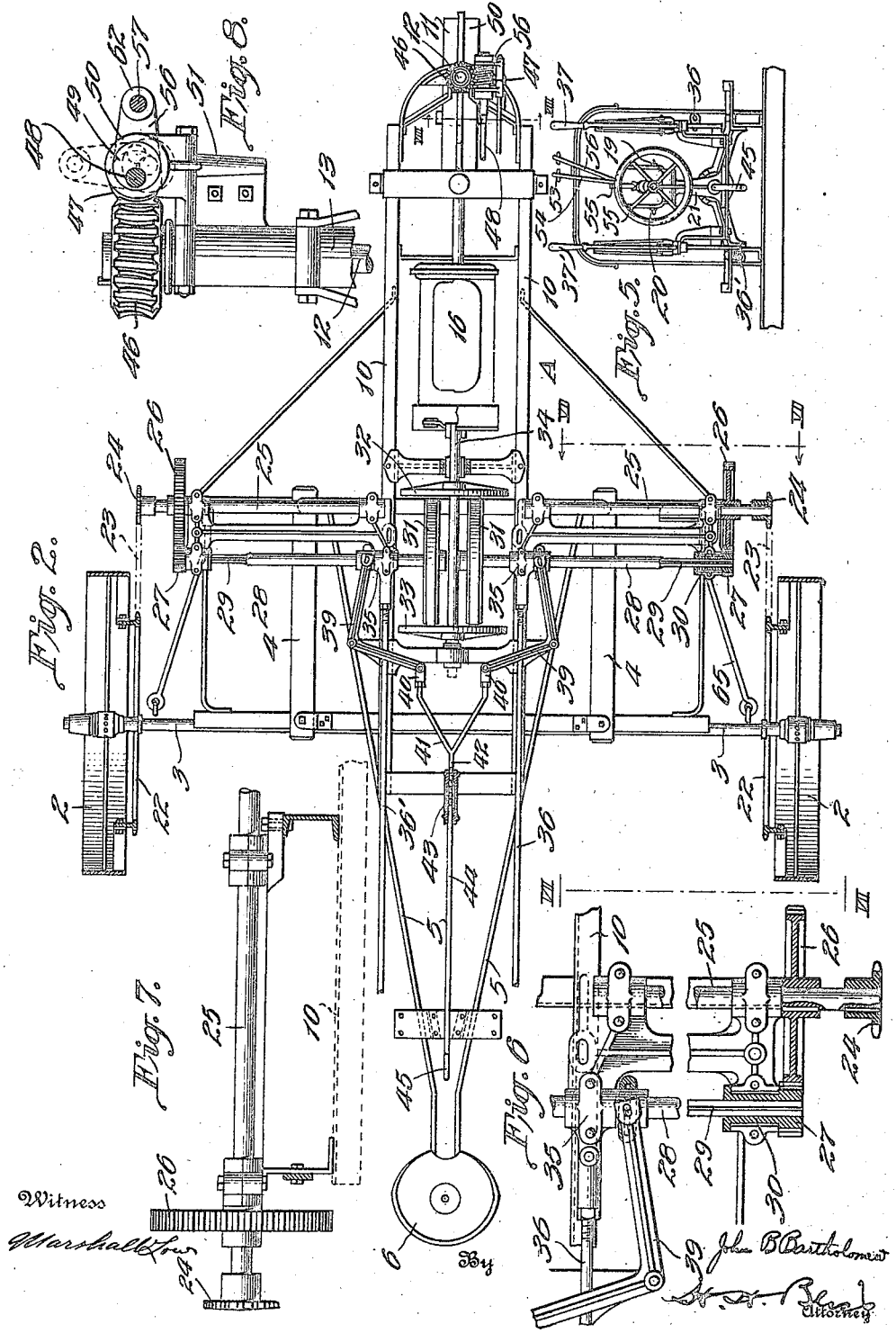

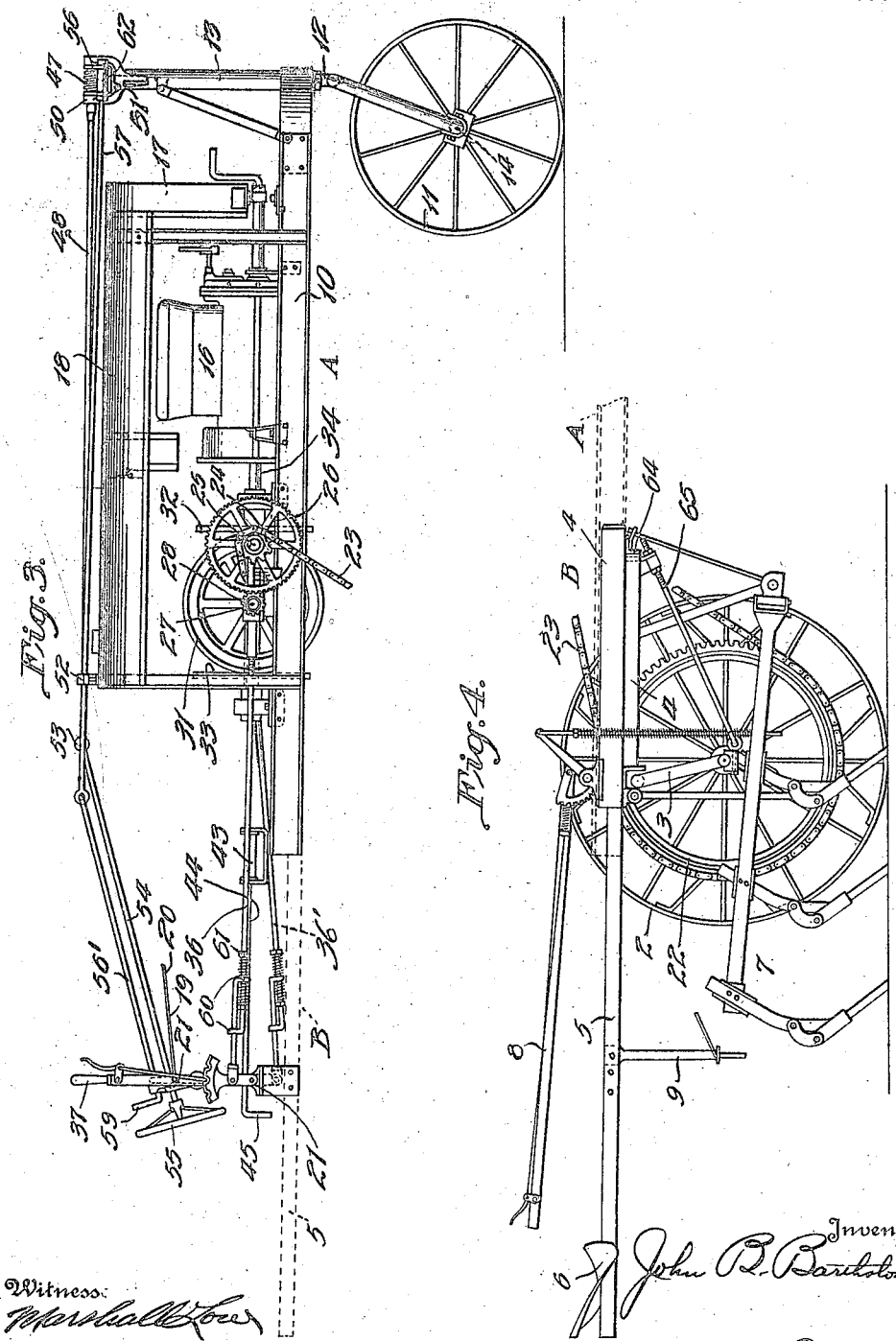

1,449,137

UNITED STATES PATENT OFFICE.

JOHN B. BARTHOLOMEW, OF PEORIA, ILLINOIS, ASSIGNOR TO AVERY COMPANY, OF PEORIA, ILLINOIS, A CORPORATION OF ILLINOIS.

POWER-DRIVEN-IMPLEMENT VEHICLE.

Application filed March 8, 1917, Serial No. 153,381. Renewed October 14, 1922. Serial No. 594,654.

*To all whom it may concern:*

Be it known that I, JOHN B. BARTHOLOMEW, a citizen of the United States, residing at Peoria, in the county of Peoria and State of Illinois, have invented certain new and useful Improvements in Power-Driven-Implement Vehicles, of which the following is a specification, reference being had therein to the accompanying drawing.

My invention relates to motor-propelled implement vehicles and has for its object to simplify such machine, to increase its mobility, and to render it easy to manipulate—as will be pointed out in the following specification.

The accompanying drawings illustrate the invention applied to a cultivator having a pair of gangs or soil stirring tools; but it should be understood that the invention is not to be limited in its useful applications to an implement of this specific character.

In the accompanying drawings, Figure 1 is a side elevation of the complete machine, the cultivator gangs and their adjusting devices, the spokes of the main supporting wheels, and details of the motor being omitted for the sake of clearness, as they form no part of the present invention.

Figure 2 is a top plan view of the machine, parts being in horizontal section, and other parts omitted.

Figure 3 is a side view of the main frame, detached, carrying the motor and other parts of the machine.

Figure 4 is a side elevation of the cultivator frame, detached, carrying the other parts of the machine, here also the spokes of the main supporting wheels being omitted.

Figure 5 is a rear elevation of the portion of the machine represented in Figure 3.

Figure 6 is a plan view with parts in horizontal elevation illustrating mechanism for adjusting the movable parts of the train of driving gearing, drawn on a larger scale than the views thus far described.

Figure 7 is a transverse sectional view taken on the section lines VII—VII of Figures 2 and 6.

Figure 8 is a detail vertical sectional view, taken on the line VIII—VIII of Figure 2.

In the accompanying drawings A indicates as a whole the main frame supporting the motor 16 and other parts to be described, and B indicates as a whole the cultivator frame—these two being united to form the complete machine. The cultivator frame is, in its main features, of common construction, and need not therefore be illustrated or described in much detail. For the purpose of understanding the present invention, it is sufficient to say that it comprises a pair of ground and main supporting wheels 2, mounted upon an arched axle 3 that is supported by horizontal frame sills 4. The frame has a rearward extension 5, by which is supported the driver's seat 6. In this frame are supported in any preferred or well known manner sets of cultivator gangs 7 provided with lifting devices controlled by levers 8, that extend rearwardly so as to be within convenient reach of the person occupying the seat 6. The cultivator gang frames, as is usual, are supported so as to have a certain freedom of lateral movement, and are controlled directly by the operator through means indicated at 9, provided for that purpose.

10 represents the base of the main frame A, this being preferably formed of longitudinal sills of channel iron and suitable connecting and bracing members. To these longitudinal sills of the main frame are united the horizontal sills 4 of the cultivator frame B, in any suitable manner to form a substantial, rigid unitary frame work.

The forward end of the main frame A is supported by a single caster wheel 11, mounted at the lower end of a vertically disposed spindle 12, that passes through a braced sleeve or tube 13, carrying suitable bearings for the spindle. The caster wheel turns upon a stub axle 14 at the lower end of the spindle 12, which is cranked or offset just below the frame parts 10. An internal combustion engine 16, having the usual accessories of such a motor, including a radiator, 17, is mounted on the frame A beneath a canopy 18 that protects it from the elements. 19 and 20 are respectively the spark and throttle levers that extend from the engine rearwardly to positions within convenient reach of the driver of the machine, where they are supported in a standard 21.

Secured to each ground wheel 2, is a sprocket wheel, 22 connected by a chain 23 with a sprocket pinion 24 at the end of a transverse shaft 25. Each shaft 25 carries a gear wheel 26 that meshes with a gear pinion 27 on a shaft 28, suitably supported in the frame A parallel with the shaft 25. The outer end of the shaft 28 is made angular in cross section, as represented at 29, permitting the shaft to slide in the hub 30 of the pinion 27.

Each shaft 28 carries at its inner end a friction wheel or disk 31, the inner ends of these shafts coming close to each other near the central longitudinal axis of the machine as a whole. The friction disks 31 are parallel, and are arranged between friction driving disks 32 and 33, with the faces of which they are adapted to engage, such driving disks being mounted on the main engine shaft 34, the shafts 28—28 and 34 being at right angles to each other. Each shaft 28 is supported, near its inner end, in a bearing 35, that is movable to a limited extent—carrying with it the portion of the shaft it supports—so that the friction disk 31 on the shaft may be forced into working engagement with either of the driving disks, 32 or 33, or brought to an intermediate and idle position between these disks and out of working engagement with either one. In order to effect the movement of the bearing 35 just referred to, I connect therewith a shift rod leading rearwardly to a hand lever located near the driver's seat, with which it is connected. There is a shift rod and operating lever for each bearing, one of the rods being designated 36, the other 36', and one hand lever 37, and the other 37'.

As the levers 37 are used to cause the disks 31 to be moved into frictional engagement with the driving disks of the engine shaft, I prefer to interpose yielding elements between such levers and the bearings 35 in order that the driving engagement between the friction disks shall be gradual and with increasing pressure. In the arrangement that I illustrate, to effect this, each shifter rod is formed of two parts, one connected with the bearing and the other with the hand lever. These are made long enough to permit their free ends to overlap. Such ends are bent and formed into eyes 60, the eye of one part encircling the main longitudinal portion of the other part, thus making a rod that may be varied as to its length and is yet stiff laterally from end to end.

38—38 indicate coiled springs surrounding one of the parts of the shift rod and located on opposite sides of the loop 60 of the other part, and 61 are nuts secured to the rod section that the springs encircle and serving as bearings for the ends of the springs and as means by which their tension may be adjusted. The springs hold the two parts of the rod 36 yieldingly in a determined relationship, giving definite length to the rod but permitting a limited lengthening or shortening thereof as one or the other spring is put under compression by the hand lever as wheel 31 is forced into working engagement with a driving disk on the engine shaft.

One of the shifter rods, that designated 36, is connected with its operating hand lever 37 at a point above the pivot of the latter; while the other rod 36' is connected with its lever below the pivot thereof. This arrangement has been adopted in order that when both levers are simultaneously moved in a forward direction, engagement of both driven friction wheels 31 with the driving disks that cause forward propulsion of the machine is effected, and when the levers are both moved in the opposite direction, engagement with the driving disks that turns the drive wheels rearwardly is caused. When it is desired to turn the cultivator, as at the end of a row being cultivated, one of the hand levers is moved and allowed to come to a mid, or idle, position, causing disengagement of the friction disk that it controls from the forwardly driving disk, so that then only one wheel 2 is driven. Should the rearward movement of the hand lever just referred to be sufficiently great to bring the moved disk 31 into engagement with the opposite driving disk, one wheel 2 would then be driven forwardly and the other rearwardly, insuring a very short turning of the machine, as about a vertical pivot passing through the center of the driving mechanism. Whenever the machine is being turned, the front wheel 11 is left free, and acts as a caster only.

Each driven shaft 28 has connected with it a bell crank lever 39, suitably pivoted in the frame A, and arranged to move the shaft in the direction of its length, the shaft being free to slide in its bearing 35 and in the hub 30 of the pinion 27, as has been described. Such movement of the shaft carries the driven friction disk 31 toward, or away from, the axis of revolution of the driving disks 32 and 33, thus making it possible to adjust the speed at which the machine is driven. The two bell crank levers 39 are connected, by links 40, with a forked or Y-shaped bar 41, the stem 42 of which is screw-threaded and enters a tubular nut 43, that is secured to and adapted to be turned by a rod 44 that is provided at its rear end with a crank handle 45. The cranked end of the rod is supported in the standard 21, directly in front of the driver's seat. By turning the rod 44, the forked bar 41 is moved longitudinally and that in turn rocks the bell crank levers 39 to shift the shafts 28 longitudinally.

The upper end of the spindle 12, on which is supported the front caster wheel, has secured to it a worm wheel 46 with which meshes a worm 47. The worm is secured fast to a shaft 48 that extends rearward over the canopy 18 where it is supported in a bearing 52 and is connected by a universal joint 53 with an operating rod 54 that is mounted in the standard 21, and carries at its rear end the hand wheel 55. Through this train of operating devices, the driver upon the seat 6 can positively turn the caster wheel and thus direct the course of the machine, it being thus steered when in operation. The shaft 48 passes loosely through a pair of eccentrics 49 located one on each side of the worm 47 and mounted in bearing 50 formed in a support 51 suitably secured to the upper end of the sleeve 13. Each eccentric 49 is formed with an arm or extension 56, which arms are preferably united by a crossbar 62. A rod 57 connected with the connecting bar 62 is employed to rotate the eccentrics in their bearings, and thus bodily move the worm into or out of mesh with the worm wheel 46. The rod 57 extends rearwardly and is supported in the bearing 52. To its rear end is connected a second rod 56' that extends to a position near the driver, where it is supported in the standard 21, its rear end being cranked as at 59 so that it may be manipulated. As the crank 59 is thrown to the right or to the left the rod 57 is turned in such way as to carry the eccentrics toward the positions shown by full lines and dotted lines in Fig. 8. Shifting the rod 57 so as to throw the worm entirely out of mesh with the worm wheel 46 leaves the front caster wheel free, thus permitting the machine to be turned through a manipulation of the engine connections, as has been described.

The machine herein illustrated is a straddle row cultivator, adapted to stir the soil on both sides of two rows of a growing crop. The frame of the machine, considered as a whole, comprises a central, forwardly extending frame element that carries the steering wheel, which runs between the two rows of plants being cultivated, and the two ground or traction wheels are arranged to travel outside the said rows. The rearwardly extending seat frame is preferably centrally disposed and in line with the forward extension supported by the steering wheel.

It is to be understood that other tillage implements besides a straddle row cultivator might be connected with the motor-carrying frame which has been designated as a whole by A; and also that, when the frames are separated, as indicated in Figures 3 and 4, the cultivator is capable of independent use, either horse-drawn or motor drawn, while the motor-carrying frame may be put to a different use from that herein illustrated.

The traction wheels, the engine, the front wheel and the tools 7, are so positioned in relation to the driver's support that he can not only readily control the tool carriers (swinging them laterally with his feet and lifting them when necessary) but at all times can observe, practically simultaneously, the plant rows, the tools, the traction wheels and the front wheel, and observe closely the direction of travel of the machine in relation to the rows. The engine is carried upon the laterally restricted forward projecting part of the frame, these being so arranged as not to materially obstruct the sight of the driver, and he can accurately note the line of travel of the wheels.

As concerns the fore and aft adjustments of the shafts 28 to bring the driven friction disks 31 into working engagement with the driving disks 32, 33, it will be understood that the bearing 35 may be guided and directed in any suitable manner, the guides being slightly curved, or there being sufficient looseness between guide and bearing to permit the necessary movements, as may seem most desirable. At the outer end, each shaft may be slightly loose in its hub or bearing 30, or the latter may be supported so as to be movable as about a pivot to a slight degree to accommodate the shaft. It will be understood that the amount of movement in any case is very slight.

The arched or straddle row cross shaft 3 is connected, near its outer ends, with a cross bar 64 of the frame by adjustable tension rod 65.

In order that the mechanism, as an entirety, may be readily understood, I have herein referred to its several parts. But it will be understood that the features herein claimed are those characteristic of this mechanism as an implement vehicle. I do not herein claim any of the structural matters which can be regarded as characteristic of a mere tractor, the claims presented reciting the matters whereby the mechanism is specially adapted for implement work, regardless of any particular tools. The features referred to will be readily understood and have been fully described.

What I claim is:

1. In a power driven implement vehicle, the combination of the main frame, the motor thereon, the two remote transversely aligned traction wheels at the rear end of the frame, the centrally arranged wheel at the front end of the frame normally adapted to caster freely, the driver's support positioned behind the aforesaid parts and arranged to permit the inspection of the traction wheels the front wheel and the ground surface between and around the wheels, means operable from the driver's support to positively stop the castering of the front central wheel and cause it to steer the machine, and means operable from the driver's support for causing the engine to rotate both of the traction wheels simultaneously or to rotate one of them while the other is relatively stationary, whereby the machine is adapted to have the front wheel travel between, and the traction wheels travel outside of, two rows of plants, and to carry tools in the space between the traction wheels and in front of the driver.

2. In a power driven implement vehicle, the combination of the traction wheels, the centrally positioned front wheel, the frame having the relatively laterally widened rear portion supporting the traction wheels, and the laterally restricted central forward projecting part carrying the front wheel at the center, said central wheel being normally adapted to caster freely, an engine supported on the said central restricted part of the frame, cross shafting actuated by the engine and supported on the wider part of the frame, gearing connecting the cross shafting to the ground traction wheels, the driver's support positioned as set forth to permit inspection therefrom of the traction wheels the front wheel and the ground surface between and in front of the said wheels, means controllable manually from the driver's support for causing the engine and the transverse shafting to steer or turn the machine through the traction wheels, and manual means for controlling the lateral movements of the caster wheel and causing it to steer the machine, all of said parts being arranged as set forth to have the front wheel travel between, and the traction wheels travel outside of, two rows of plants, and to carry tools in the space between the driver's seat and the front wheel.

In testimony whereof, I affix my signature, in presence of two witnesses.

JOHN B. BARTHOLOMEW.

Witnesses:
J. M. CALDWELL,
H. N. BLACKMON.